United States Patent [19]

White

[11] 4,114,471
[45] Sep. 19, 1978

[54] ADJUSTABLE HANDLE BAR ASSEMBLY FOR ROTARY TILLER

[75] Inventor: Kenneth W. White, Bridgeton, Mo.

[73] Assignee: Atlas Tool & Manufacturing Co., St. Louis, Mo.

[21] Appl. No.: 739,707

[22] Filed: Nov. 8, 1976

[51] Int. Cl.$^2$ .............................................. B62K 21/16
[52] U.S. Cl. .................................................. 74/551.6
[58] Field of Search .................. 74/551.3, 551.1, 551.6

[56] References Cited

U.S. PATENT DOCUMENTS

| 2,401,796 | 6/1946 | Raitch | 74/551.3 X |
| 3,391,582 | 7/1968 | Polley, Jr. | 74/551.1 |

FOREIGN PATENT DOCUMENTS

| 841,442 | 7/1960 | United Kingdom | 74/551.3 |

Primary Examiner—Leonard H. Gerin
Attorney, Agent, or Firm—Cohn, Powell & Hind

[57] ABSTRACT

An adjustable handle bar assembly for a physically-guided implement such as a tiller having a handle bar rotatively mounted in a handle bar socket provided by a curvilinear panel web end and curvilinear margins of recesses formed in side flanges of a handle panel. An adjustable connection between the handle bar and the side flanges selectively adjusts the angular disposition of the handle bar in its socket. The rotative axis of the handle bar in the handle bar socket is defined by the curvilinear panel web end that embraces one side of the handle bar and the curvilinear margins of the recesses in the side flanges which embrace the other side of the handle bar. The adjustable connection includes laterally spaced arms secured to the handle bar, a bracket secured to each of the side flanges, and fasteners detachably connecting the spaced arms of the handle bar to the brackets.

7 Claims, 3 Drawing Figures

ADJUSTABLE HANDLE BAR ASSEMBLY FOR ROTARY TILLER

BACKGROUND OF THE INVENTION

This invention relates generally to an improved adjustable handle bar assembly for a physically-guided implement such as a tiller, and more particularly to an improved mounting and connection of a handle bar in a handle panel which permits selective disposition of the handle bar in different predetermined angular positions about its rotative axis for facilitating physical movement and usage of the implement.

In the heretofore conventional implements of this general type, the handle bar has a fixed attitude or angular disposition relative to the implement handle. The particular fixed disposition of the handle bar is usually a compromise and as a result it is generally not the most convenient position for most users of the implement. The most advantageous angular disposition of the handle bar is different for each implement user and is dependent on many factors such as the user's height and strength, and the type and contour of terrain in which the implement is used. In an implement such as a tiller, another factor to be considered is the depth that the blades dig into the soil because the inclination of the implement handle will vary. Accordingly, the most advantageous angular disposition of the handle bar for each user under all conditions is never achieved when the handle bar has a single fixed position.

SUMMARY OF THE INVENTION

The present adjustable handle bar assembly enables the angular disposition of the handle bar to be readily adjusted to the most advantageous position for each and every user of the implement depending upon the height and strength of the user, the type and contour of terrain in which the implement is used, i.e., under all conditions of use.

In the present handle bar assembly, the handle bar is rotatively mounted in a handle bar socket provided by a curvilinear end of a panel web and by recesses in panel side flanges adjacent the curvilinear panel web end. An adjustable connection between the handle bar and the side flanges enables the angular disposition of the handle bar in its socket to be selectively adjusted.

The handle bar socket is formed by the curvilinear panel web end that embraces one side of the handle bar, and by curvilinear margins at least partially defining the recesses in the side flanges which embrace the other side of the handle bar.

The adjustable connection between the handle bar and the panel side flanges includes laterally spaced arms secured to the handle bar, a bracket secured to each of the side flanges, and means detachably and selectively connecting the spaced arms to the brackets.

More particularly, each bracket is provided with a plurality of bolt holes located at different radii from the rotative axis of the handle bar in the handle bar socket and selectively alignable with a plurality of bolt holes in the laterally spaced arms, whereby to dispose the handle bar in different predetermined angular positions. Bolt fasteners extending through aligned bolt holes secure the arms to the brackets and retain the handle bar in a selected, adjusted predetermined angular position.

DESCRIPTION OF THE PREFERRED EMBODIMENT

Figures 1, 3:
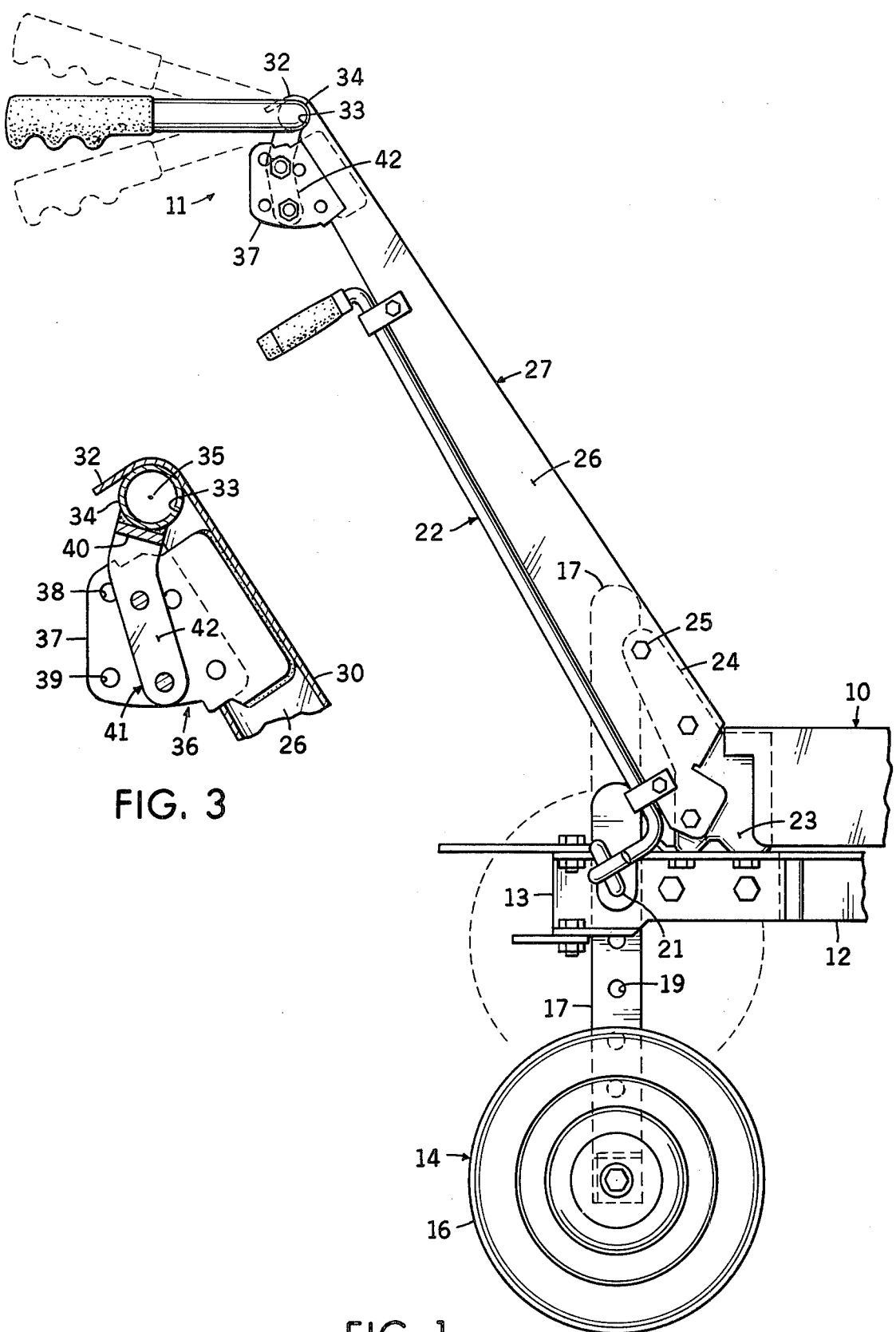
FIG. 1 is a fragmentary, side elevational view of the handle bar assembly on an implement, the handle bar being shown in different adjusted angular positions in broken lines.
FIG. 3 is an enlarged cross-sectional view of the handle bar assembly as seen on line 3—3 of FIG. 2.

Referring now by characters of reference to the drawings, and first to FIG. 1, the implement generally indicated by 10, on which the handle assembly referred to by 11, is utilized, is a tiller. The power means and cultivating blades of the tiller are not shown because such is conventional and not pertinent to the present invention. The implement 10 includes a base 12 on which the power means and cultivating blades are mounted.

Attached to the rear end of the base 12 by a suitable bracket 13, is an adjustable wheel assembly referred to by 14. The wheel assembly 14 includes an axle sleeve 15 carrying a pair of ground wheels 16. A vertical arm 17 is fixed to the axle sleeve 15 and extends upwardly through a socket 18 formed in the mounting bracket 13. The arm 17 is provided with a series of regularly, longitudinally spaced holes 19 that are selectively alignable with compatible holes 20 formed in the bracket 13 so as to receive a locking pin 21. The height of the wheel 16 can be readily adjusted by simply withdrawing the locking pin 21 so as to release the arm 17, and then raising or lowering the arm 17 to locate the wheels 16 in the desired height position, and then locking the arm 17 in place by inserting the locking pin 21 through aligned arm and bracket holes 19 and 20.

A remote control mechanism referred to by 22 is operatively connected to the locking pin 21 for withdrawing and inserting the locking pin 21 incident to adjusting the height of wheels 16. However, the detail of the remote control mechanism is not discussed because it does not form a part of the present invention.

Figure 2:
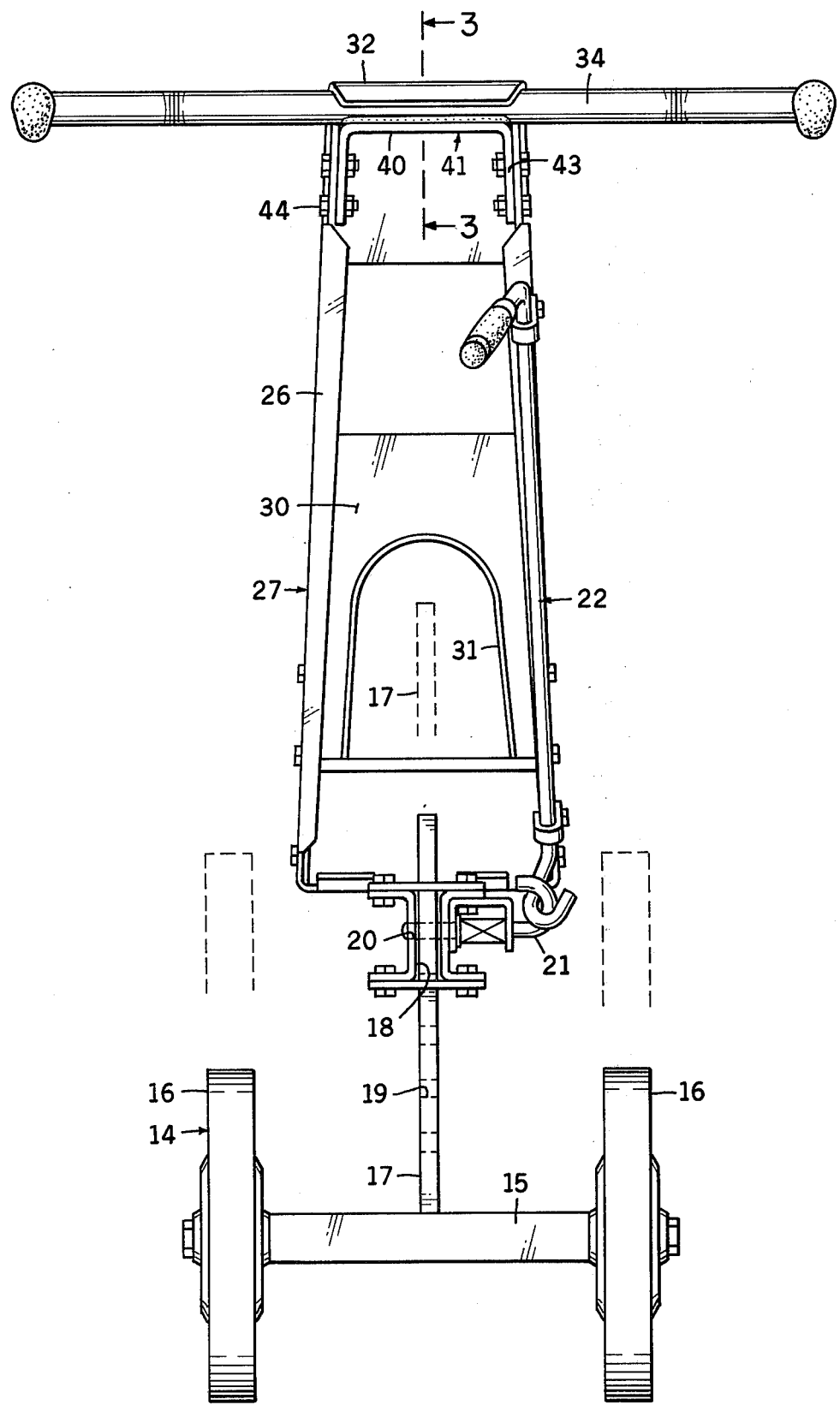
FIG. 2 is a rear elevational view of the handle bar assembly and implement of FIG. 1.

Secured at the rear of the implement base 12 is a mounting bracket 23 having upstanding side arms 24. Secured by bolts 25 to the side bracket arms 24 are the side flanges 26 of a handle panel generally indicated by 27. The handle panel 27 also includes a transverse web 30 between the side flanges 26, the web 30 including a lower opening 31 through which the adjustable arm 17 may extend upon adjustment of the wheel height. The handle panel 27 has a generally upwardly tapering configuration as is best seen in FIG. 2. Further, the side flanges 26 of the handle panel 27 generally converge upwardly as is best shown in FIG. 1.

In the handle bar assembly 11, the web 30 of the handle panel 27 is provided with a curvilinear web end 32 extending laterally from the same side of the web 30 as the side flanges 26. Formed in the side flanges 26, adjacent the curvilinear panel web end 32, are recesses 33, the curvilinear web end 32 and recesses 33 providing a handle bar socket.

Located in the handle bar socket is a handle bar 34 that extends laterally beyond the side panel side flanges 26. More particularly, the curvilinear panel web end 32 embraces one side of the handle bar 34, and curvilinear margins, at least partially defining the recesses 33 in side flanges 26, embrace the other side of the handle bar 34, to define the rotative axis 35 of the handle bar 34.

An adjustable connection referred to by 36, between the handle bar 34 and the side flanges 26, enables the selective adjustment of the angular disposition of the handle bar 34 in its socket. This adjustable connection 36 includes bracket plates 37 fixed as by welding to the side flanges 26. Each of the bracket plates 37 is provided with a plurality of coacting bolt holes 38 and 39 located at different radii from the rotative axis 35 of the handle bar 34.

Fixed to the handle bar 34, between the side flanges 26 and below the panel web 30 and curvilinear panel web end 32, is a web portion 40 of a substantially U-shaped bracket referred to by 41. The substantially U-shaped bracket 41 also includes a pair of laterally spaced arms 42 that extend forwardly into close adjacency with the inside surfaces of bracket plates 37. Each of the arms 42 is provided with a pair of longitudinally spaced, bolt holes 43 that are selectively alignable with different pairs of compatible bolt holes 38-39 formed in the bracket plates 37 at different angular positions of the handle bar 34. Bolt fasteners 44 extend through the selectively aligned arm holes 43 and bracket plate holes 38-39 to secure the arms 42 to the bracket plates 37, and thereby retain the handle bar 34 in a predetermined angular position.

To adjust the handle bar 34 to a different predetermined angular position, the bolt fasteners 44 are detached and the handle bar 34 is rotated in its handle bar socket 33 about the rotative axis 35 and as guided by the curvilinear margins of recesses 33 and the curvilinear panel web end 32, to align the bolt holes 43 of the arms 42 with the desired pair of bolt holes 38-39 in the bracket plates 37. When located in the desired angular position, the bolt fasteners 44 are attached to secure the arms 42 to the bracket plates 37 and thereby hold the handle bar 34 in the adjusted predetermined angular position.

It will be understood that the handle bar 34 in bearing against the curvilinear margins of the panel recesses 33 and the curvilinear panel web end 32, is assured of rotating about the rotative axis 35 and in readily and accurately aligning the compatible bolt holes of the arms 42 and bracket plates 37 during adjustment. However, the panel recesses 33 are open at the bottom and unobstructed by the panel web end 32 so as to permit withdrawal and removal of the handle bar 34 if and when desired.

I claim as my invention:

1. An adjustable handle bar assembly for an implement, comprising:
   (a) a handle panel including a web and side flanges, the panel web having a curvilinear end, and the side flanges having recesses adjacent the curvilinear panel web end, to provide a handle bar socket,
   (b) a handle bar rotatively mounted in the handle bar socket and extending laterally beyond the side flanges, and
   (c) an adjustable connection between the handle bar and side flanges to adjust selectively the angular disposition of the handle bar in its socket.

2. An adjustable handle bar assembly as defined in claim 1, in which:
   (d) the curvilinear panel web end embraces one side of the handle bar and the recesses in the side flanges being at least partially defined by curvilinear margins that embrace the other side of the handle bar, to define the rotative axis of the handle bar.

3. An adjustable handle bar assembly as defined in claim 1, in which:
   (d) the adjustable connection includes:
      (1) laterally spaced arms secured to the handle bar, and
      (2) means detachably and selectively connecting the spaced arms to the side flanges in different angular dispositions of the handle bar.

4. An adjustable handle bar assembly as defined in claim 1, in which:
   (d) the adjustable connection includes:
      (1) a bracket secured to each of the side flanges, and
      (2) means detachably and selectively connecting the handle bar to the brackets in different angular dispositions of the handle bar.

5. An adjustable handle bar assembly as defined in claim 1, in which:
   (d) the adjustable connection includes:
      (1) laterally spaced arms secured to the handle bar,
      (2) a bracket secured to each of the side flanges, and
      (3) means detachably and selectively connecting the spaced arms to the brackets in different angular dispositions of the handle bar.

6. An adjustable handle bar assembly as defined in claim 1, in which:
   (d) the adjustable connection includes:
      (1) laterally spaced arms secured to the handle bar, each arm being provided with a plurality of bolt holes,
      (2) a bracket secured to each of the side flanges, each bracket being provided with a plurality of bolt holes located at different radii from the rotative axis of the handle bar in the handle bar socket and selectively alignable with the bolt holes in the arms to dispose the handle bar in different predetermined angular positions, and
      (3) bolt fastening means extending through the selectively aligned bolt holes and securing the arms to the brackets to retain the handle bar in a predetermined angular position.

7. An adjustable handle bar assembly as defined in claim 1, in which:
   (d) the curvilinear panel web end embraces one side of the handle bar, and the recesses in the side flanges being at least partially defined by curvilinear margins that embrace the other side of the handle bar, the curvilinear panel web and curvilinear side flange margins defining the rotative axis of the handle bar, and
   (e) the adjustable connection includes:
      (1) a substantially U-shaped bracket having a web portion secured to the handle bar below the panel web end, and laterally spaced arms, each arm being provided with a plurality of bolt holes located at different radii from the rotative axis of the handle bar in the handle bar socket,
      (2) a bracket plate secured to each of the side flanges, each bracket plate being provided with a plurality of bolt holes located at different radii from the rotative axis of the handle bar in the handle bar socket and selectively alignable with the bolt holes in the bracket arms to dispose the handle bar in different predetermined angular positions, and
      (3) bolt fastening means extending through the selectively aligned bolt holes and securing the bracket arms to the bracket plates to retain the handle bar in a predetermined angular position.

* * * * *